United States Patent [19]
Delatorre

[11] Patent Number: 5,142,913
[45] Date of Patent: Sep. 1, 1992

[54] NON-QUARTZ RESONATING TRANSDUCER

[75] Inventor: Leroy C. Delatorre, Sugar Land, Tex.

[73] Assignee: Panex Corporation, Sugar Land, Tex.

[21] Appl. No.: 571,569

[22] PCT Filed: Mar. 1, 1990

[86] PCT No.: PCT/US90/01061
§ 371 Date: Mar. 1, 1990
§ 102(e) Date: Mar. 1, 1990

[51] Int. Cl.⁵ .......................... G01L 7/04; G01L 11/00
[52] U.S. Cl. ........................................ 73/704; 73/735; 73/743; 73/862.41
[58] Field of Search ................. 73/704, 702, 733, 735, 73/736, 741, 738, 742, 743, DIG. 1, 826, 862.41, 862.47, 862.48

[56] References Cited
U.S. PATENT DOCUMENTS

| | | | |
|---|---|---|---|
| 3,479,536 | 11/1969 | Norris | 73/DIG. 1 |
| 3,618,391 | 11/1971 | Rivkin et al. | 73/704 |
| 4,455,874 | 6/1984 | Paros | 73/704 |
| 4,476,725 | 10/1984 | Chorel et al. | 73/704 |
| 4,651,569 | 3/1987 | Paros et al. | 73/704 |
| 5,036,715 | 8/1991 | Hanson | 73/704 |

Primary Examiner—Donald O. Woodiel
Attorney, Agent, or Firm—Donald H. Fidler

[57] ABSTRACT

A transducer for measuring a moment force as a related function of pressure and tension where a spirally wound bourdon tube has a confined end arrayed to apply a moment force to pretensioned metal vibratory elements. The change in tension in the pretensioned vibratory elements produces a change in frequency which is related to pressure in the bourdon tube. The vibratory elements are maintained at equally applied tension so that a temperature change changes the frequency of the vibrating elements and can be utilized to correct pressure measurements.

38 Claims, 7 Drawing Sheets

NON-QUARTZ RESONATING TRANSDUCER

FIELD OF THE INVENTION

This invention relates to force responsive transducers, and more particularly, to sensitive accurate non-quartz force responsive vibrating transducers or resonators which are particularly useful for pressure measurements in oil field applications.

BACKGROUND OF THE INVENTION

By way of introduction and background, the use of a quartz element as a force sensing resonator is known. The quartz piezoelectric element in a force sensing resonator is typically a vibrating quartz member in a single or double beam arrangement where an applied force is placed on a vibrating beam. The force is a function of pressure so that pressure measurements can be obtained. The applied force, when changed as a function of pressure, changes the resonant frequency of the piezoelectric quartz element. The change in frequency can be correlated to the change in force caused by a change in pressure. These devices are characterized by use of a pressure conversion device such as a bourdon tube which produces a force causing a proportionately small increment of dimensional change in the quartz element for a large range of pressure change in the bourdon tube.

Both amorphous and crystalline quartz are often preferred as the sensor material for use in pressure measurement devices because quartz has a low coefficient of thermal expansion, low hysteresis and good repeatability characteristics. Quartz, however, is difficult to shape in small and precise dimensions in an elongated beam or a cylindrical elongated rod. Structurally, quartz is stronger in compression than in tension. A beam member constructed from quartz with a square or rectangular cross section is very limited in tensile strength before breaking (a low tensile strength). In compression, a quartz beam member suitable for resonating or vibrating purposes will buckle if placed under significant compression forces. A quartz beam member designed for force measurement purposes usually has dimensions which make it relatively fragile and thus presents difficult manufacturing and assembly problems.

One type of force measuring device which utilizes a vibrating quartz resonator or quartz beam can be likened to two tuning forks coupled tine to tine and placed under tension or compression. This device has a high mechanical "Q". "Q" is the relationship of energy stored to energy lost and represents efficiency. As a practical matter, the dimensions of the resonator beam members which approximate the two tines of such a tuning fork will not exactly match dimensionally. Thus, the respective tines of the resonator beam members inherently have different resonant frequencies which lowers the overall "Q". It is also not practically possible to apply exactly equal forces (to be measured) to each tine or beam member which causes an error because of the differing resonant frequencies of each tine which, in turn, lowers the overall "Q".

In a single beam type of quartz resonator where the beam member is placed under compression for force measurement, the beam is subject to buckling and force moments. Under tension, a single beam member is limited to its breaking strength. A single beam is also very shock sensitive and delicate to handle. While single beam quartz resonators overcome the drawbacks of tuning fork resonators, they must be decoupled from reactions with the mounting structure to obtain a high "Q".

By far the most disadvantageous characteristics of quartz beams is the difficulty of production, the fragile nature of quartz in small dimensions and low tension limitations.

BACKGROUND PATENT ART

The use of a bourdon tube in connection with a quartz element as a force sensing resonator is shown in Paros U.S. Pat. No. 4,455,874 (issued in Class 73/704). Briefly stated, the Paros '874 patent discloses a crystaline quartz beam structure (as distinguished from amorphous quartz). The beam member is piezoelectrically vibrated at a resonant frequency. A bourdon tube is attached to ends of the beam member and responds to pressure to alter or change the frequency of vibration of the beam member by subjecting the beam member to tension. The frequency of the beam can be measured and is a function of pressure in the bourdon tube. In FIG. 9 of the patent, a push-pull or torque responsive arrangement of resonators are shown.

The patent to Rivkin et al. U.S. Pat. No. 3,618,391 discloses a pressure transducer in which a pair of curved pressure vessels are connected to each other through a resilient ribbon so that the tension imparted to the resilient ribbon is a function of the pressure in the pressure tubes. The resilient ribbon is driven in a vibratory manner by electromagnets. Fluid pressure is applied to the pressure tubes through a capillary tube and a passage and tends to uncoil the pressure tubes. Uncoiling the pressure tubes applies additional expanding tension to the vibrating ribbon. As a result, the natural frequency of oscillations in the vibrating ribbon are varied according to variations in tensions about the prestressed level. The frequency of oscillation of the resilient ribbon is proportional to the pressure being measured.

The patent application to Giers UPA Ser. No. 037654 discloses a U-shaped pressure vessel having its ends joined by a resilient metal ribbon. The ribbon is mechanically vibrated by an alternating current passing therethrough in the presence of a magnetic field generated by permanent magnet. The resonant frequency of the ribbon is at a frequency dependent on the tension in the ribbon. Fluid pressure applied to the tube tends to open the legs, increasing the tension on the ribbon above the level of pre-tension. The frequency of vibration of the ribbon thus provides an indication of the pressure in the tube.

U.S. Pat. No. 4,215,570 issued to EerNisse (Class 73/141R) discloses a specifically stated ratio of dimensions for a force resonator constructed from quartz where a narrow slot is provided between two vibrating bars.

U.S. Pat. No. 4,384,495 issued to Paros (Class 73/862.59) shows a crystal double ended tuning fork structure in which the tines of the resonator are equally loaded so that the bars can have the same frequencies under loading for canceling out reactive moments.

U.S. Pat. No. 4,448,546 issued to Paros (Class 374/117) relates to a temperature sensor where a load sensitive crystal resonator is mounted to a base having a different coefficient of expansion different from the resonator. Thermal expansions and contractions between the resonator and the base change the resonate frequency.

U.S. Pat. No. 4,531,073 to EerNisse (Class 310/3701) relates to crystal resonators operating in air. The patent disclosure relates to an electrode pattern on a quartz crystal to render the resonate frequency insensitive to humidity changes in the environment.

U.S. Pat. No. 4,558,600 to Lee (Class 73/862.64) relates to a quartz capacitance type transducer where the structure is intended to maintain parallelism of the capacitor plates.

U.S. Pat. No. 4,592,663 to EerNisse (Class 374/117) relates to a tuning fork quartz transducer for measuring temperature where the dimensions of the transducer are selected to avoid spurious modes of operation.

U.S. Pat. No. 4,724,351 to EerNisse (Class 310/328) relates to a double resonating beam force transducer configuration of quartz for making the beams vibrate symmetrically.

U.S. Pat. No. 3,470,400 to Weisbord (Class 310/15) relates to a single beam transducer with isolator masses and isolator springs for decoupling the vibratory member from its mounts.

U.S. Pat. No. 4,279,155 to Balkanli (Class 73/386.6) relates to a bourdon tube transducer with conductive plates which vary the frequency of an oscillator as a function of the deflection of the bourdon tube.

U.S. Pat. No. 4,372,173 (Class 73/862.59) to EerNisse relates to selection of beam dimensions for quartz resonator for obtaining a high mechanical Q.

In most of these patents, quartz is used as the sensor material and they are accordingly imbued with most of its attendant limitations and disadvantages.

SUMMARY OF THE INVENTION

In the present invention, the transducer includes two elongated vibrating metal elements (resonators) which are tensioned and which are electromagnetically vibrated at resonant frequencies by oscillators. A bourdon tube is coupled in a force-balanced relationship to the vibrating metal elements and tensioned to produce a common bias preset tension or force to both vibrating metal elements. The bourdon tube is also arranged to produce a moment force which changes the tension in each of the vibrating metal elements. Pressure in the bourdon tube produces the moment force which oppositely changes the respective preset tension in each of the vibrating metal elements. The change in preset tensions produces a change in the frequency of vibrations of the metal elements. The frequencies of vibration of the two metal elements is a function of the pressure in the bourdon tube.

The vibratory metal elements are mounted so that temperature effects on the elements produce an equal change in the common bias force or the preset tension in the elements which acts equally on the preset tension in each of the vibrating metal elements.

The changes in tension due to moment forces are measured as changes of frequencies which are a function of the pressure to be measured. The relationship of the frequencies of the vibrating elements is a function of the force to be measured. The changes in tension due to temperature are measured as changes in frequencies which can be used to calibrate the pressure measurements.

The present invention is distinguishable in a number of respects from quartz resonators. The advantages of quartz are 1) high Q, 2) dimensional stability, 3) good elastic characteristics and 4) low temperature coefficient of expansion. Disadvantages are that quartz is fragile and difficult to produce and handle in minute or small dimensional sensors.

In the present design, materials having higher temperature coefficient of expansions than quartz can be utilized because the resonators are arranged to cancel out effects or changes in the resonators due to dimensional instability or temperature effects. The present design also utilizes small displacement quantities which are dimensionally stable and the present design has a wider modulation of frequency which compensates for inherent electrical instability characteristics of the oscillator thereby providing a higher resolution response.

The present invention is utilized with a bourdon tube or other force responsive device where a pair of vibrating elongated metal elements (resonators) are under a preset initial tension. An oscillator circuit vibrates each metal element at a resonate frequency. A bourdon tube or other device is attached to the metal elements to apply a moment force to increase the tension in one vibrating element and decrease the tension in the other vibrating element. This changes the frequency in each vibrating element.

The bourdon tube is constrained from displacement by the vibrating elements to a small part of its inherent unconstrained displacement so that the effects of dimensional stability, creep, and hysteresis of the bourdon tube are reduced by that factor. That is to say, the force displacement is in micro inches for a full range of pressure measurements. This occurs because the displacement due to pressure in the bourdon tube effectively becomes determinable by the constrained vibrating elements and the bourdon tube only acts as a pressure to force converter.

Since the vibrating elements are the constraint, the elastic properties of the vibrating elements are critical. In the case of a true vibrating string, the frequency is determined solely by tension and the density per unit length of the string. Since the bourdon tube is acting as a pressure to force converter then its elastic characteristics become unimportant. In the case of a vibrating beam, however, the modulus of elasticity of the beam becomes a factor (a string does not have this factor because it is perfectly limp by definition). The hysterisis of the measurement is effectively determined by the hysterisis of the vibrating elements. Dimensional instability and creep of the resonator, however, are also divided by the same factor as the bourdon tube. (These are both displacement parameters).

The Q of the metal resonator can also be brought to acceptable levels by proper selection and processing of materials and the utilization of the tuning fork type construction. The use of a bridge type oscillator also reduces the requirement for a high Q so that excellent results can be obtained with the metal element.

The design of the resonator pressure sensor allows the following important features:

A. two matched resonators that are both exposed to the same environment to cancel out any effects of loading by residual gas in the atmosphere;

B. near ideal matching of the two vibrating elements to effectively cancel zero pressure long term creep or dimensional instability. The vibrating elements are so closely matched because they are etched adjacent to one another from the same piece of material at the same time with the accuracy provided by electroetching;

C. the close matching of the resonators also helps to reject any variation of the bias tension with time;

D. the moment constraint on the bourdon tube is the optimum condition to minimize stress levels in the tube induced by pressure.

E. dimensional instability of the resonators cancels at any pressure since it not a function of stress. Changes due to stress fall under the category of creep. Dimensional stability of the bourdon tube, however, will appear in the measurement reduced by the ratio of constrained displacement to unconstrained displacement;

F. the unconstrained displacement of the bourdon tube can be increased by merely adding turns to the coil. The moment developed by each coil is the same, even through the diameter is changing. Increasing the number of turns also increases the displacement for the bias tension and thereby reduces the variation in bias force for displacements due to temperature, etc. This allows more effective rejection of these effects.

DESCRIPTION OF THE PRESENT INVENTION

Figure 1:
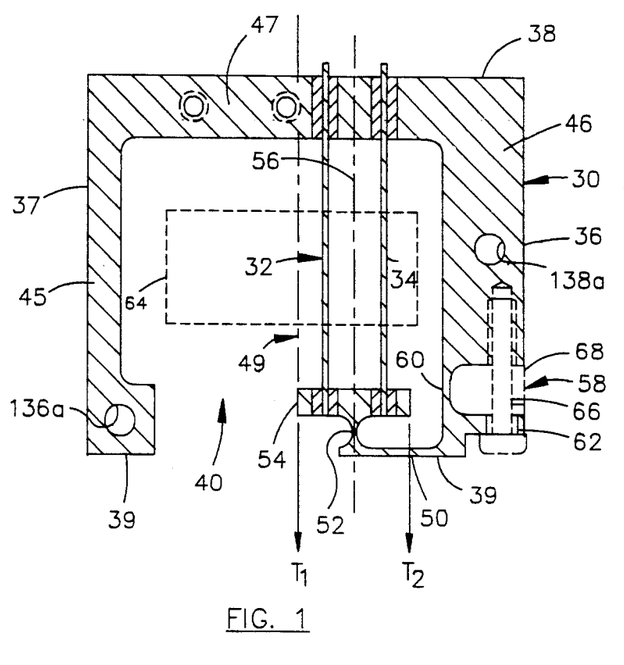
FIG. 1 is schematic view in cross section of vibratory elements of a force responsive transducer to illustrate the concepts of the present invention.
Figure 2:
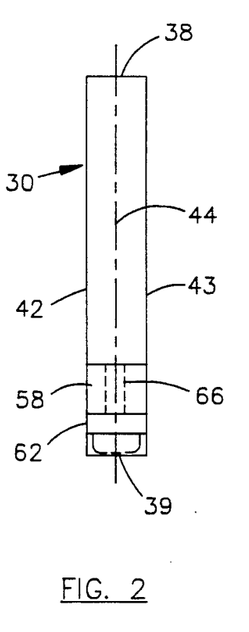
FIG. 2 is a side view of the apparatus shown in FIG. 1.

Referring now to FIG. 1 and FIG. 2, a frame member 30 for mounting spaced apart, vibrating metal resonator elements 32,34 is illustrated. The frame member 30, constructed from commercially available KOVAR material, has a generally rectangular configuration with parallel outer side surfaces 36,37, an outer upper surface 38 and a outer lower surface 39. The outer lower surface 39 is discontinuous, being interrupted by an open space 40. The forward and rearward side surfaces 42,43 of the frame member 30 are parallel to one another. (See FIG. 2). A vertical plane 44 (FIG. 2) bisects the frame member 30 and is located midway of the frame member 30 between the side surfaces 42,43. For reference and orientation purposes, the height of the frame member 30 is about 0.760 inches, the width is about 0.900 inches and the thickness is about 0.125 inches.

The central inner portion of the frame member 30 is cut away or formed to define spaced apart vertical frame sections 45,46 coupled to one another by an upper transverse of horizontal frame section 47. Midway of the length of the transverse frame section 47 is a centrally located vertical central axis 49 which is parallel to and equidistantly spaced from the outer side surfaces 36,37. The central axis 49 is in the vertical plane 44 (FIG. 2) which is located midway between the side surfaces 42,43. One of the outer lower surfaces 39 is on a frame portion which has a thin wall, rectangularly shaped cross section and defines a flexible beam or flat spring portion 50. The flat spring portion 50 extends to the open area 40 but terminates short of the central axis 49.

At the terminal end of the flat spring portion 50 is a vertical connector pivot or tension portion 52 which is joined to a rectangularly shaped, horizontally disposed tension platform portion 54. The tension platform portion 54 is centered on the connector pivot portion 52. The connector pivot portion 52 serves as a pivot location for the platform section 54.

Two elongated metal elements 32,34, constructed from electrically conductive non-magnetic metal (such as tungsten) in a wire shape, have a parallel relationship and respectively are attached to the platform portion 54 and to the upper transverse frame section 47. The vibrating elements 32,34 are located and secured to the platform portion 54 and to the transverse frame section 47 by electrical insulating glass which is fused in location bores in the frame section 47 and in the platform portion 54. The glass serves to attach the vibrating elements 32,34 to the frame member 30 and electrically insulate the vibrating elements 32,34 with respect to the frame member 30.

The respective ends of the vibrating metal members 32,34 are connected to electrical circuitry, as will hereinafter be described, so that electrical current is conducted through the vibrating metal elements and induces vibrations as will be explained. The vibrating metal elements 32,34, respectively, are equidistantly spaced from a vertical axis 56 which is located intermediate of the vibrating elements 32,34 and where such vertical axis 56 is in the plane 44 between the side surfaces 42,43 and also bisects the connector pivot portion 52. Thus, the axis 56 and the axis 49 are in the common vertical plane 44. With this construction, preset tension forces $T_1$ and $T_2$ can be applied by wire members attached to the ends of the platform portions 54. The vertical connector pivot portion 52 located midway between the vibrating elements 32,34 assures that the preset tension forces $T_1$ and $T_2$ in each of the vibrating elements 32,34 are equally affected by changes due to effects of temperature variations or aging. As will be shown hereafter, the structure is arranged so that pressure measurements can be compensated or corrected (calibrated) for temperature.

Figure 3:
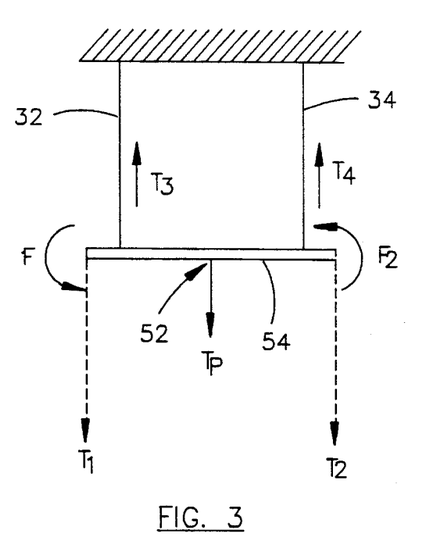
FIG. 3 is a force diagram related to FIG. 1.

The temperature compensation concept can be more easily visualized with reference to FIG. 3 where the wire elements 32,34 extend between a fixed frame section 47 and the platform section 54. The preset tension forces $T_1$ and $T_2$ equal an effective total tension force $T_p$ at the pivot portion 52. The tension force $T_p$ effectively applied at the connector pivot portion 52 results in upward tension forces $T_3$ and $T_4$ in the wires 32,34 respecively downward the downward tension force $T_p$ is equal to twice the forces $T_3$ and $T_4$. Changes in the total tension force $T_p$ equally affects the tension forces $T_3$ and $T_4$. An applied moment force $F_2$ upwardly at one end of the platform equals the downward moment force $F_1$ at the other end. The moment forces $F_1$ and $F_2$ change the tension forces $T_3$ and $T_4$ in each of the elements 32,34. It should be noted that the tension forces $T_3$ and $T_4$ can be preset equal but this is not required. If the tension forces $T_3$ and $T_4$ have preset different values, a change in the value of the tension force $T_p$ will equally affect the tension forces of both elements 32,34.

In the vertical frame section 46 adjacent to the flat spring portion 50 is an outer transverse notch 58 which extends inwardly from the outer side surface 36 to a location where a thin rectangular shaped beam portion 60 is formed. The beam portion 60 permits one end 62 of the vertical frame section 46 to flex or move relative to a vertical plane extending through the beam portion 60.

As will be explained later, the initial tension forces $T_1$ and $T_2$ applied to the ends of the platform section 54 can be preset equal and will produce an equal preload or pretension force in the vibrating elements 32,34 which is equal to and opposite to the sum of the two tension forces $T_1$ plus $T_2$.

With the above described structure and as described with respect to FIG. 3, if the tension force $T_1$ applied to one end of the platform portion 54 along the central axis 49 is thereafter increased while the tension force $T_2$ at the other end of the platform portion 54 is decreased, then a moment force is applied to the platform portion 54 about the connector pivot portion 52. An increase in the tension force $T_1$ at one end of the platform portion 54 will increase the tension in the vibrating member 32 and the tension in the other vibrating member 34 will be decreased because of the pivoted beam effect produced by the moment force.

Thus, the sensor system includes a pair of pre-tensioned vibrating metal members or resonators 32,34 which are coupled to a force balanced beam member 54. A moment force applied to the beam member 54 produces a difference in tension between the two vibrating elements 32,34 where the difference in tension changes the vibrating frequency of the resonators 32,34. The change in frequency can be correlated to the magnitude of change in the applied force moment.

To conduct measurements of the applied force moment, the vibrating elements 32,34 are vibrated by electromechanical means 64 (described later). The vibrating elements 32,34 initially have predetermined resonant frequencies which are set by the pre-tensioning of the vibrating elements. However, a force moment changes the frequencies in each of the vibrating elements where the frequencies vary as a function of the change in the tension forces caused by the applied force moment.

In the above description the pre-tension is applied to the vibrating elements 32,34 by wire members. In some instances it may be desired to pre-tension the vibrating elements 32,34 by means of the frame member 30. In this case, the desired bias or pre-tension on each of the metal vibrating elements 32,34 can be obtained in the following manner. A machine screw 66 is inserted through an opening in the end of the vertical frame section 46 and through the notch 58. The screw 66 is threaded into a threaded bore in the main body of the vertical frame section 46. The screw 66 thus can produce or apply a force moment on the one end 62 of the vertical frame section 46 to flex the beam portion 60 and thereby to move the flat spring portion 50 counterclockwise which tensions the vibrating members 32,34 to obtain a desired predetermined tension. Because the vibrating elements 32,34 are equidistantly spaced relative to the connector pivot portion 52 on the frame member 30, with this arrangement, the tension on each of the vibrating elements 32,34 is essentially equal at the preloaded tension condition is essentially equal to the other. To maintain the selected preloaded bias tension on the vibrating elements 32,34, a keeper plate member 68 (shown in dashed line) can be resistance welded to the outer side surface 36 of the frame member 30 at locations above and below the notch 58. This will permanently freeze the pre-tension setting in the vibrating elements 32,34 and the screw 66 can then be removed and discarded.

Figure 4:
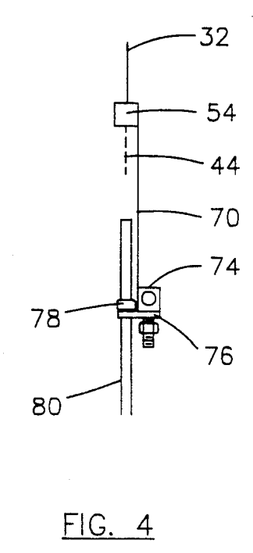
FIGS. 4, 5 and 6 respectively, are side, front and rear schematic views of a pressure/force connector system to illustrate concepts of the present invention.
Figure 5:
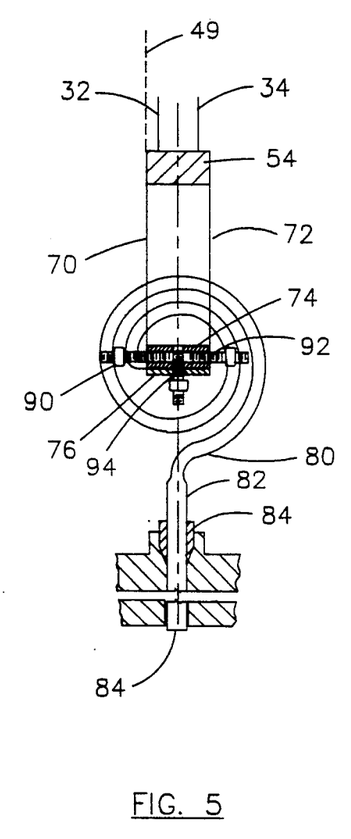
Figure 6:
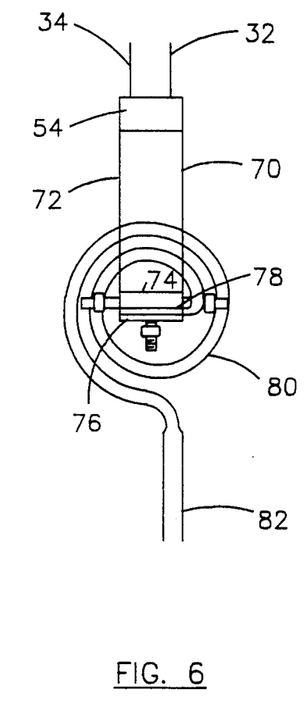

Referring now to FIGS. 4–6, the rudiments of a force connector to couple a spirally arranged bourdon tube to the balanced beam portion 54 are illustrated. The platform or balanced beam portion 54 is connected at its extremities to the ends of a pair of stainless steel wire tension members 70,72. The other ends of the wire members 70,72 are connected to the extremities of an elongated transverse, coupling block member 74. The coupling block member 74 may be rectangular in cross section and is constructed from stainless steel. An elongated plate member 76 attached to the block member 74 provides a base to which a straight segment portion 78 on the end of a bourdon tube 80 is lengthwise attached. The segment portion 78 closes off the end of the bourdon tube 80. The straight segment portion 78 is disposed perpendicular to the wire members 70,72 and joins the remainder of the bourdon tube which spirals generally in a plane which coincides with the vertical plane 44 through the axes 49 and 56. The bourdon tube 80 is flat oval in cross section with a spiral configuration which enables it to respond to pressure changes in its interior to develop a force related to the pressure. The bourdon tube 80 spirals one and three-quarter turns about the midpoint of the plate member 76 and has an open end straight section 82 which is aligned with the axis 56 located between the vibrating elements 32,34. The open end straight section 82 is pulled through a swage nut 84 to apply tension forces $T_1$ and $T_2$ (see FIG. 3) to the wire members 70,72 and pre-tension the elements 32,34. The swage nut 84 is adjustably mounted in a threaded opening in the wall of the sensor housing. When the desired tension forces are obtained in the metal elements 32,34, the nut 84 is tightened and tack welded in place to fix the bourdon tube 80 in position. Thus, the tube section 82 is fixed to the housing for the sensor and the metal elements are pre-tensioned.

Figure 7:
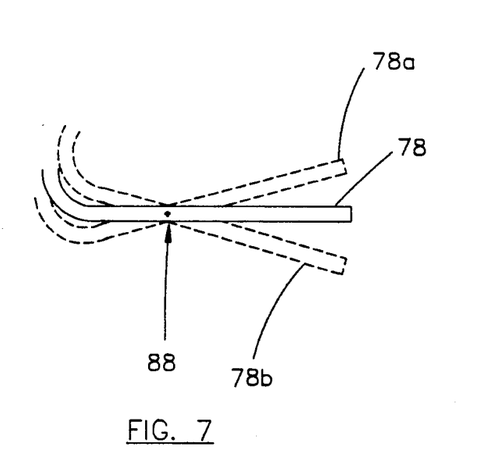
FIG. 7 is an enlarged partial view of the end of a bourdon tube shown in FIG. 6.

Referring to FIG. 5 and FIG. 7, when liquid or fluid under pressure is admitted to the open end 84 of the bourdon tube 80, the resultant effect (if unconstrained) would be to tilt or pivot the straight segment 78 end portion of the bourdon tube 80 where the tilt would be in a plane aligned with the plane 44 through the vibrating elements 32,34. When attached to the elements 32,34, the bourdon tube 80 is essentially constrained but produces a force moment which produces a downward (or increased) force in one of the wires 70,72 and an upward (or reduced) force in the other of the wires 70,72. This, in turn produces a force moment on the platform portion 54 which produces a corresponding tension change in each of the pre-tensioned vibrating metal elements 32,34. The force is produced by a displacement of about 200 microinches.

Referring briefly to FIG. 7, the straight segment or stub end 78 of the bourdon tube 80 (if unconfined or unrestrained) would tilt or pivot upwardly as shown by the dashed line 78a if the pressure in the bourdon tube 80 decreases. Alternatively, if the pressure in the bourdon tube 80 increases, the straight segment 78 would tilt or pivot downwardly (if unconfined or unrestrained) as shown by the dashed line 78b. As can be noted, the change in position of the straight segment 78 is about a pivot point or location 88 which is offset from the midpoint of the straight segment 78. The offset of the pivot point 88 in the segment 78 of the bourdon tube will produce unequal forces in the wires 70,72 for a pressure applied at the open end 84. Thus the pivot point 88 for a pressure range, for best results, should be aligned with the axis 56 through the midpoint of the plate 76.

Referring back to FIGS. 4-6, to balance the effects of gravity, machine screws and nuts 90,92 are received in a threaded bore in the coupling member 74 where the bore is located to extend transverse to the wire members 70,72. By adjusting the location of the nuts and screws 90,92 in the ends of the coupling member 74, a gravitational balance point with respect to mass can be obtained. At the midpoint of the coupling member 74 is a vertical threaded opening which receives a machine screw and nut 94. The screw and nut 94 is used to counterbalance the weight effect of the platform section 34 when the assembly is at another angle of orientation with respect to the earth gravity. Once the system is balanced, the screws and nuts are fixed in position by an adhesive or the like.

Figure 8:
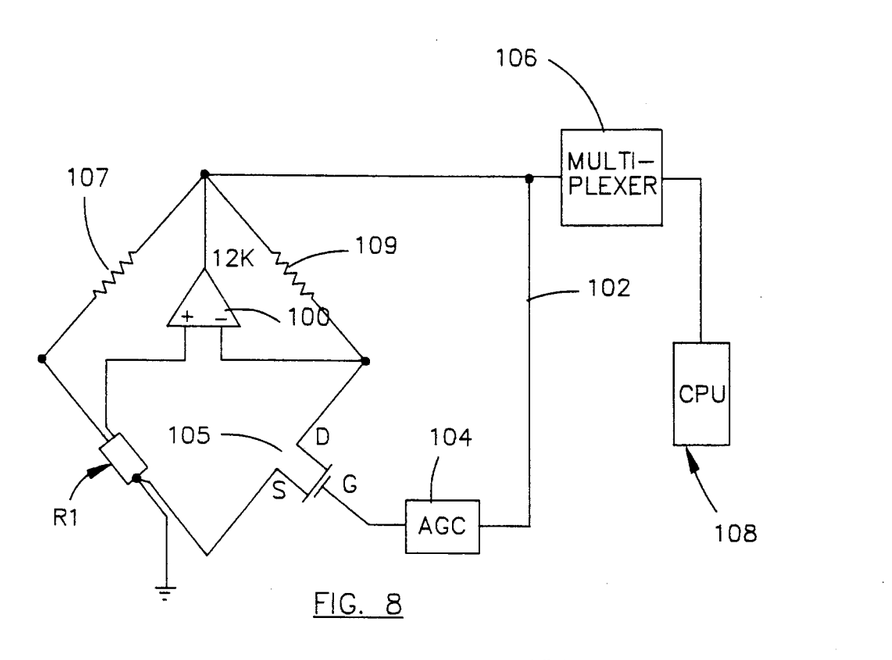
FIG. 8 is a schematic representation of electrical circuit means suitable for use with the present invention.

Referring now to FIG. 8, a schematic illustration of an operating system is shown. A vibrating element or resonator $R_1$ is coupled between electrical ground and an A.C. amplifier 100, the amplifier has a feedback loop 102 to an automatic gain control 104 which controls a field effect transistor 105. The amplifier 100 outputs a frequency signal to a multiplexer 106 which provides a digital representation of the frequency signals to a standard computer CPU unit 108. Resistors 107,109 complete the bridge circuit. The other vibrating element $R_2$ is similarly coupled to an oscillator (as described above) which connects to the CPU 108 via a multiplexer. It will be appreciated that other forms of electrical bridge measuring circuits can be utilized for the vibratory elements $R_1$ and $R_2$ a matter of design preference in obtaining frequency measurements. In any event, the CPU unit 108 processes the frequency measurements (which vary as a function of tension in the vibratory elements) in a manner which will be described hereafter to obtain a summation of frequencies and a difference in frequencies.

Figure 9:
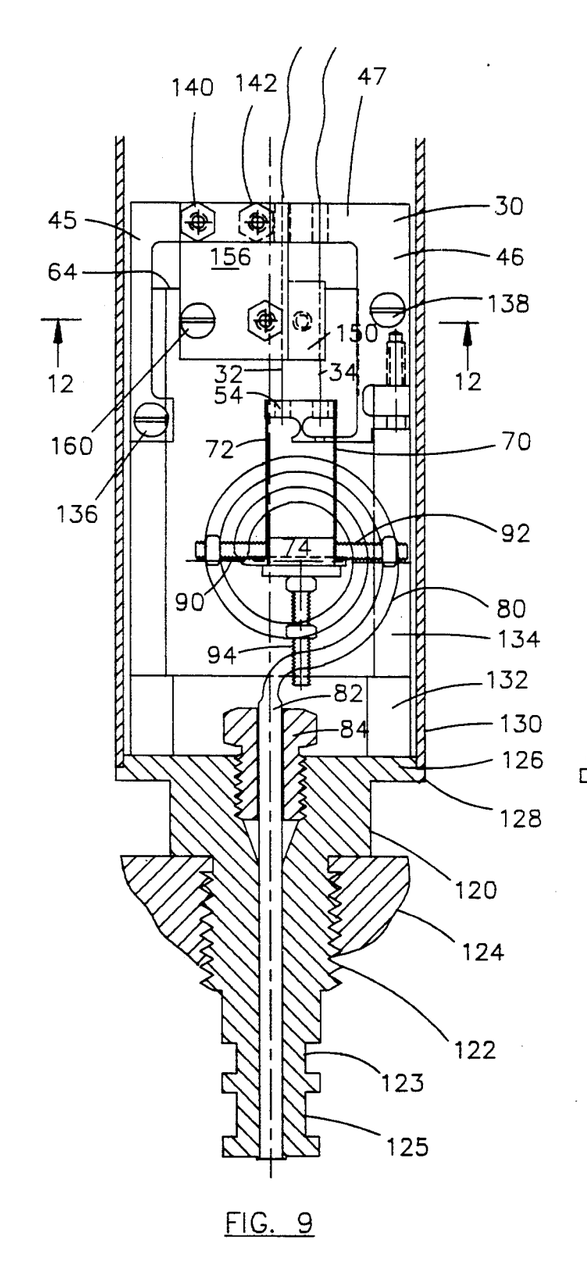
FIG. 9 is a frontal view of a form of assembly of a transducer embodying the present invention.
Figure 10:
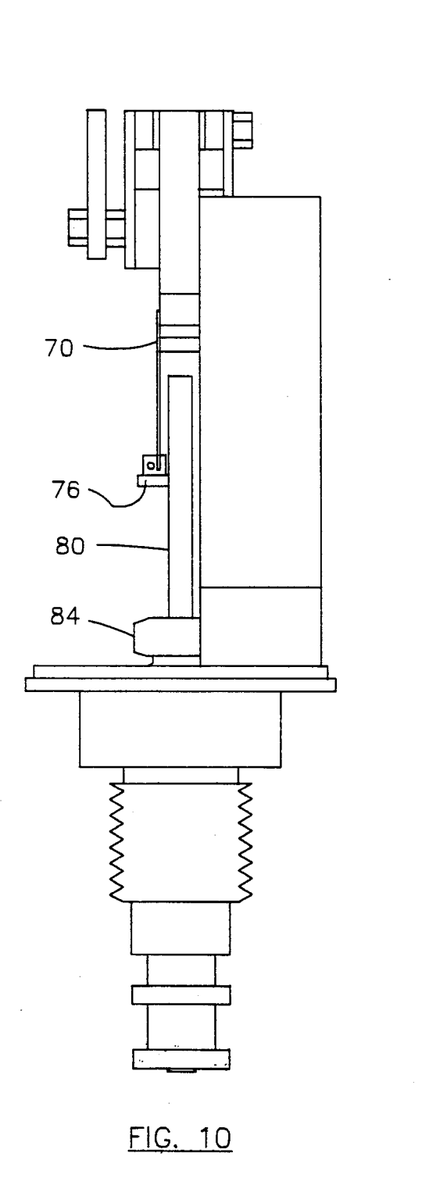
FIG. 10 is a side view of the apparatus shown in FIG. 9.
Figure 11:
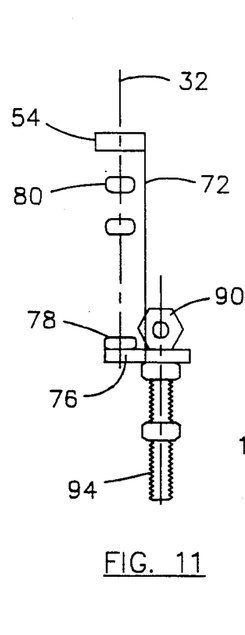
FIG. 11 is a partial side view of the bourdon tube and wire connectors shown in FIG. 9.

Referring now to FIG. 9, an embodiment of the present invention is illustrated. FIG. 10 is a partial side view of the structure shown in FIG. 9. A tubular base member 120 is the structural supporting member for the resonators. The base member 120 has an external lower thread 122 for attachment in a threaded bore in a bulkhead 124 of a tool housing. The base member 120 has a lower stem portion with o-ring grooves 123,125 for o-ring seals and an upper support section with a cylindrical base 126 which has a stepped cylindrical section 128. A tubular isolating housing or enclosure 130 has its lower open end sealingly connected to the base member 120. The housing 130 and the base member 120 can be constructed from stainless steel. Within the housing or enclosure 130 are vertically stacked elongated support members 132,134 which have a C-shaped cross section. The support members 132,134 are suitably attached to one another and to the base member 120 but spaced from the inner cylindrical wall of the housing 130 so as to isolate the support members from the housing 130 and to provide a base for attachment of the frame member 30. The interior of the housing 130 and the components therein are normally in a vacuum condition for operation.

The frame member 30 is attached to vertical faces on the support member 134 by means of bolts or screws 136,138 which pass through openings 136a,138a (See FIG. 1) in the frame member 30 and threadedly attach in threaded bores in the support member 134.

Figure 12:
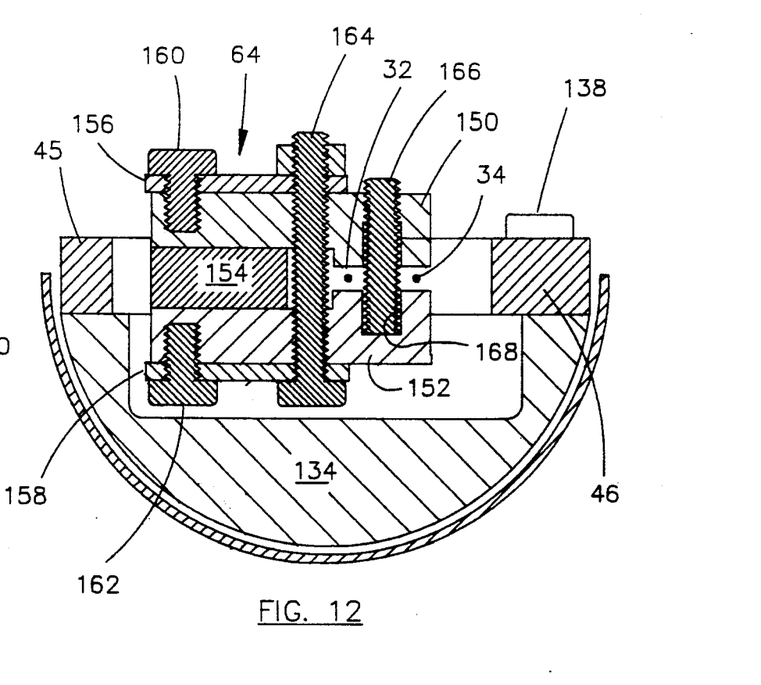
FIG. 12 is a view taken along line 12—12 of FIG. 9.

The electromagnetic means 64 for vibrating the resonators 32,34 is attached to the frame member 30 by screws. With respect to the electromagnetic means 64, referring to FIG. 12, intermediate the length of the vibrating elements 32,34 are spaced apart magnetic pole members 150,152. The pole members 150,152 are L-shaped and separated from one another by permanent magnet bar member 154. Non-magnetic cover plates 156,158 are attached by non-magnetic screws 160,162 to the pole members 150,152. The screws or bolts 140,142 (FIG. 9) also extend through the cover plate 156 and into the frame member 30. The cover plates 156,158 can be aluminum which is 0.032 inches thick. A threaded member 164 extends through bores and a gap between the magnetic pole members 150,152 to draw the magnetic pole members 150,152 toward one another. A threaded adjusting member 166 in a threaded bore in the magnetic pole member 150 extends into a blind bore 168 in the other magnetic member 152. The member 166 is disposed midway between the vibrating elements 32,34 and can be used to adjust the spacing or gap between the magnetic pole members 150,152. The vibrating elements 32,34 are preferably centered in the gap between the facing surfaces of the magnetic pole members 150,152.

In operation, the vibrating elements 32,34 are resonators which are under a preset bias tension as initially determined by a tension force applied to each of the vibrating elements 32,34. The frequency of the vibrating elements 32,34 is determined by the tension, the density per unit length, the modulus of elasticity, and the dimensional factors of the vibrating element. A magnetic field is established by the magnetic pole pieces 150,152 and the magnetic field is normal to the longitudinal axis of the vibrating elements 32,34. The resonant elements 32,34 are caused to vibrate at their resonant frequencies by connection to oscillators as shown in FIG. 8. When oscillating electrical current is passed through the vibrating elements 32,34 the elements vibrate at a base resonate frequency at the preset tension which exists in each vibrating element. When pressure in the bourdon tube 80 produces a moment force in the stub straight segment 78, the preset tension is increased in one element 32,34 and is decreased in the other element 32 or 34 so that there is a change in the frequency in each of the elements 32,34. The difference in the frequencies is a function of the pressure in the bourdon tube and the moment force produced.

While the foregoing structure utilizing metal wire members as vibratory elements is acceptable for a number of applications, it is possible to increase the Q factor by use of metal vibrating beam elements as the vibrating elements. To construct metal beam elements, electroetching is utilized to obtain matched elongated metal beam members with sufficient flexibility for high sensitivity when placed under tension. Quartz beams have a high Q factor but require stiff beams to allow compression loading or to provide strength in tension. The stiff beams of quartz give low force sensitivity which limits the variation tolerance of frequency in the oscillator over the operating force range. Since metal beam elements do not have this limitation of stiffness, the more flexible metal beams can accept large frequency variations of the oscillator and thus offset the effect of lower inherent "Q" of metal beams.

With the metal beam elements of the present invention as described hereafter, the Q factor is lower than quartz but the increase in frequency modulation is tolerant of and accommodates wider oscillator cycle variations which enhances the accuracy of the measurements.

Figure 13:
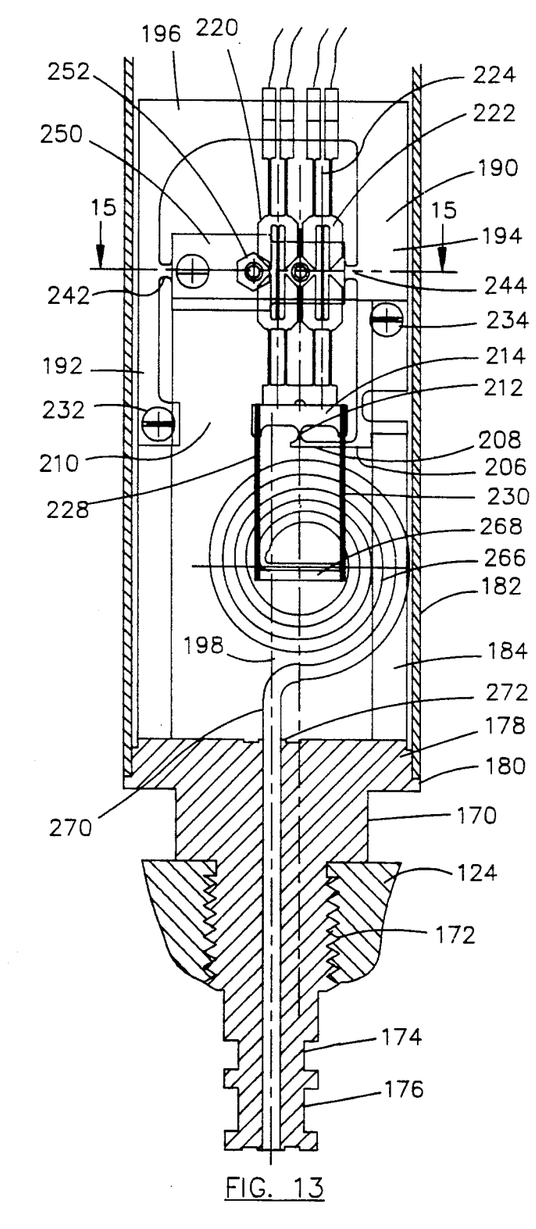
FIG. 13 is a view similar to FIG. 9 but illustrating a different mode of the invention.

Referring now to FIG. 13, a transducer construction is illustrated with common structure to the structure as shown in FIG. 9 but illustrating a different form of vibratory metal elements, a different form of attachment of the bourdon tube to the housing and a different form of electromagnetic means.

Referring now to FIG. 13, in this embodiment of the present invention a tubular base member 170 is part of the structural supporting means for the resonators. The base member 170 has an external lower thread 172 for attachment in a threaded bore in a bulkhead 124 of a tool housing. The base member 170 has a lower stem portion with o-ring grooves 174,176 for o-ring seals and an upper support section with a cylindrical base 178 which has a stepped cylindrical section 180. A tubular isolating housing or enclosure 182 has its lower open end sealingly connected to the base member 170. The housing 182 and the base member 170 can be constructed from stainless steel. Within the housing or enclosure 182 is a vertically elongated support member 184 which has a C-shaped cross section. (See FIG. 15). The support member 184 is suitably attached to the base member 170 but spaced from the inner cylindrical wall of the housing 182 so as to isolate the support member 184 from the housing 182. The support member 184 provides a base for attachment of a frame member 190. The interior of the housing 182 and the components therein are normally in a vacuum condition for operation.

Figure 14:
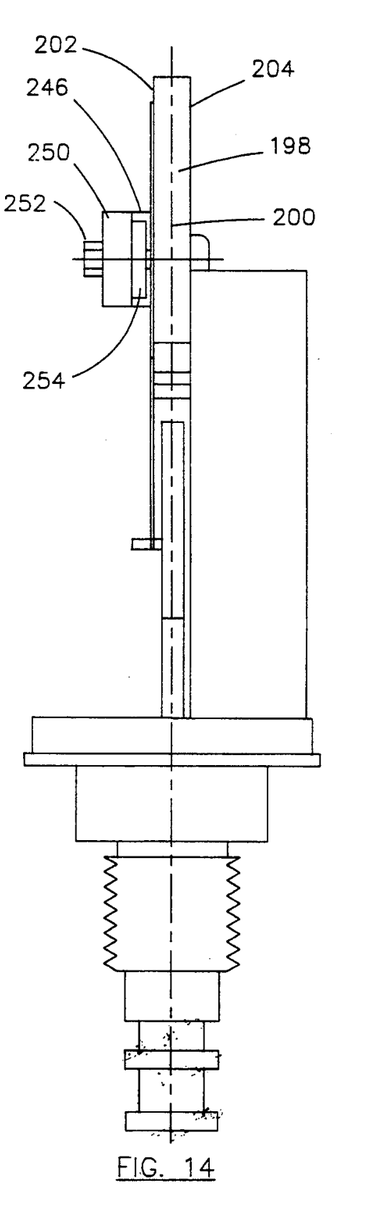
FIG. 14 is a side view of the apparatus shown in FIG. 13.

The frame member 190 is similar to the frame member 30 previously described. The frame member 190, constructed from commercially available KOVAR material, has a generally rectangular configuration with spaced apart vertical frame sections 192,194 coupled to one another by an upper transverse or horizontal frame section 196. Midway of the length of the transverse frame section 196 is a centrally located vertical central axis 198 which is parallel to and equidistantly spaced from the outer side surfaces of the frame sections 192,194. The central axis 198 is in the vertical plane 200 (FIG. 14) which is located midway between side surfaces 202,204 of the frame member 190. One of the outer lower surfaces 206 is on a frame portion which has a thin wall, rectangularly shaped cross section and defines a flexible beam or flat spring portion 208. The flat spring portion 208 extends to an open area 210 but terminates short of the central axis 198.

At the terminal end of the flat spring portion 206 is a vertical connector pivot or tension portion 212 which is joined to a rectangularly shaped, horizontally disposed tension platform portion 214. The tension platform portion 214 is centered on the connector pivot portion 212. The connector pivot portion 212 serves as a pivot location for the platform section 214.

Two elongated metal vibratory elements 220, 222, constructed from electrically conductive non-magnetic metal plate (as will be more fully described later). The vibratory elements 220,222 have a parallel relationship and respectively are attached to the platform portion 214 and to the upper transverse frame section 196. The vibratory elements 220,222 are located and secured to the platform portion 214 and to the transverse frame section 196 by electrical insulating glass. The glass serves to attach the vibratory elements 220,222 to the frame member 190 and to electrically insulate the vibratory elements 220,222 with respect to the frame member 190.

The respective ends of the vibratory metal members 220,222 are connected to electrical circuitry so that electrical current is conducted through the vibratory metal elements and induces vibrations of the vibratory elements. The vibratory metal elements 220,222 respectively, are equidistantly spaced from a vertical axis 224 which is located intermediate of the vibratory elements 220,222 and where such vertical axis 224 is in the plane 200 between the side surfaces 140,142 and also bisects the connector pivot portion 212. Thus, the axis 224 and the axis 198 are in the common vertical plane 200. With this construction, preset tension forces can be applied by wire members 228,230 attached to the ends of the platform portion 214.

The frame member 190 is attached to vertical faces on the support member 184 by means of bolts or screws 232,234 which pass through openings in the frame member 190 and threadedly attach in threaded bores in the support member 184.

The electromagnetic means for vibrating the resonators 220,222 includes a rectangularly shaped pole portion 240 which extends transversely between the vertical frame sections 192,194 and is connected to the frame sections by thin connector sections 242,244.

Figure 15:
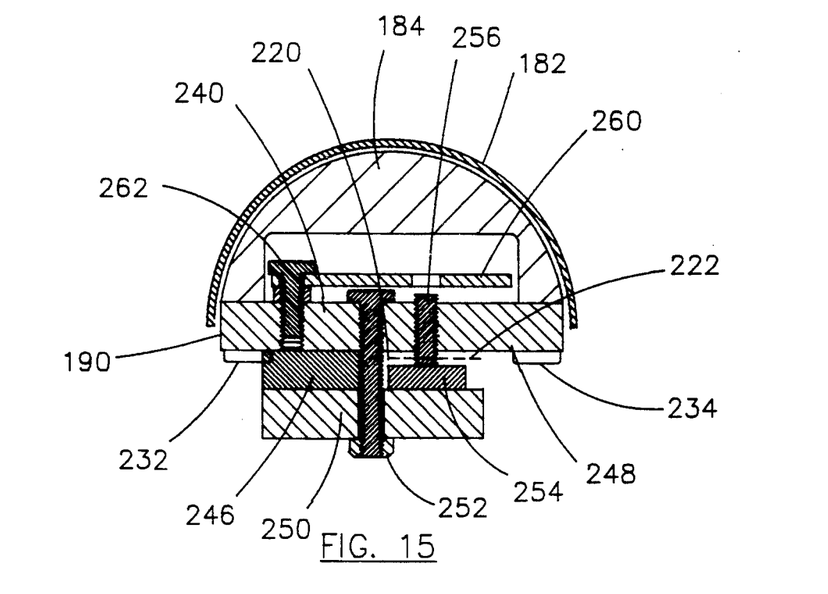
FIG. 15 is a view in cross section taken along line 15—15 of FIG. 13.
Figure 16:
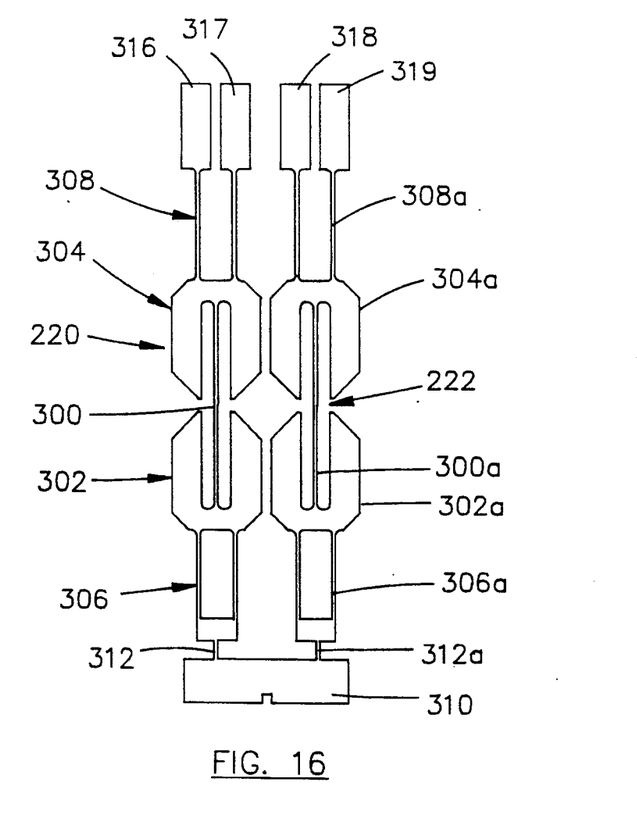
FIG. 16 is an enlarged plan view of the vibratory elements to a frame member.

A rectangular magnet member 246 is disposed between the forward face 248 of the pole portion 240 and a rectangularly shaped pole piece 250. A single nut and bolt means 252 holds the assembly together. On a facing surface of the pole piece 250 is an attached flux concentrator plate 254. A screw member 256 is threadedly attached to the pole portion 240 and provides means for adjusting the spacing of the pole pieces from the reasonators 220,222. It should be noted that the flux concentrator plate 254 is continuous and not notched so that the magnetic field is essentially uniform and transverse to the beams and across the masses 302,302a,304 (FIG. 16) and 304a. This prevents eddy currents from circulating in the masses and damping their vibration. As shown in FIG. 15, an electrical terminal board and shield 260 can be attached by a screw 262 to the frame member 190 with a provision for electrical insulation.

In FIG. 13, for assembly purposes, the bourdon tube 266 is attached to the coupling plate 268 and the end 270 of the bourdon tube is attached by welding at a location 272 to the base member 170. In construction, the vibrating elements 220,222 are attached to the frame member 190 and the frame member 190 is attached to the support member 184 with the wires 228,230 attached. The bourdon tube 266 is welded in place. The coupling block 268 is moved upwardly by a removable member (not shown) to preload the bourdon tube. Then the wires 228,230 are attached to the block 268. When the removable member is removed, the bourdon tube 266 then pretensions the transducer vibrating elements 220,222 of the resonators.

The frame member 190 is attached to vertical faces on the support member 184 by means of bolts or screws 232,234 which pass through openings in the frame member 190 and threadedly attach in threaded bores in the support member 184. A final step welds the frame member 190 to the support member 184 and the screws are discarded.

In operation, the vibratory elements 220,222 are resonators which are under a preset bias tension as initially determined by a tension force applied to each of the vibratory elements 220,222. The frequency of the vibratory elements 220,222 is determined by the tension in each element, the density per unit length, the modulus of elasticity and the dimensional factors of the vibratory element. A magnetic field is established by the magnetic pole pieces 240,254 and the magnetic field is normal to the longitudinal axis of the vibratory elements 220,222. The resonant elements 220,222 are caused to vibrate at their resonant frequencies by connection to oscillators as shown in FIG. 8. It is noted that a two wire connection is utilized, so that when oscillating electrical current is passed through the vibratory elements 220,222 the resistance of the connecting leads is not included as a part of the frequency determining impedance of the resonator. When pressure in the bourdon tube 266 produces a moment force in the stub straight segment at the end of the bourdon tube, the preset tension is increased in one element 220,222 and is decreased in the other element 220 or 222 so that there is a change in the frequency in each of the elements 220,222. The difference in the frequencies is a function of the pressure in the bourdon tube and the moment force produced in the bourdon tube.

The vibratory means 220,222 of the resonators basically consist of beam members constructed from an electroetched metal plate member. (See FIG. 16). As shown in plan view in FIG. 16, the plate member has vibratory metal elements 300,300a separate sets of upper and lower isolation masses 302,304 and separate sets of isolator springs 306,308. This is generally described in Weisborg U.S. Pat. No. 3,470,000. The metal elements 300,300a are formed by electroetching a plate member which is 0.005 inches thick. The plate member is constructed from a non-magnetic, high strength material with good elastic properties such as ELIGLOY which is available from the Elgin Company in Elgin, Ill. The plate member has a first, lower base portion 310 which is rectangularly shaped. The isolator springs 306,306a are respectively coupled to the base portion 310 by a cross-piece and single element 312,312a. This arrangement eliminates undesirable forces in the springs 306,306a when the base member 310 is subjected to a moment force. The single elements 312,312a are axially aligned with the respective vibratory beam elements 300,300a. The single connector element isolates the effect of the moment force from the springs. The upper springs 308,308a on the vibratory elements 300,300a are respectively connected to base portions 316–319.

Figure 17:
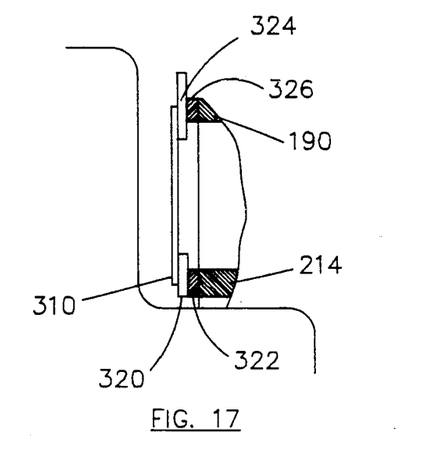
FIG. 17 is a schematic illustration of attachment of vibratory elements to a frame member.

The width of the second base portion 310 is 0.200 inches and it can be attached by resistance welding to a KOVAR strip member 320 (see FIG. 17) where the KOVAR strip is attached to the platform portion 214 by electrically insulating glass 322. Similarly, the upper base members 316–319 can have a width enabling attachment by resistance welding to a KOVAR strip 324 where the KOVAR strip is attached to the frame member 190 by glass 326.

For given tension forces, the beam elements 300,300a have a resonant frequency. An increase or decrease in the tension of a beam element 300,300a changes the frequency in relation to the change in tension. The masses 302,302a 304,304a and the springs 306,308,306a,308a are arranged to decouple any reactive forces or moment forces generated by the beam elements 300,300a from the base portions 310, 316–319. As a result the vibratory beam elements 300,300a are decoupled from the mounting bases and develop a higher "Q".

Figure 18:
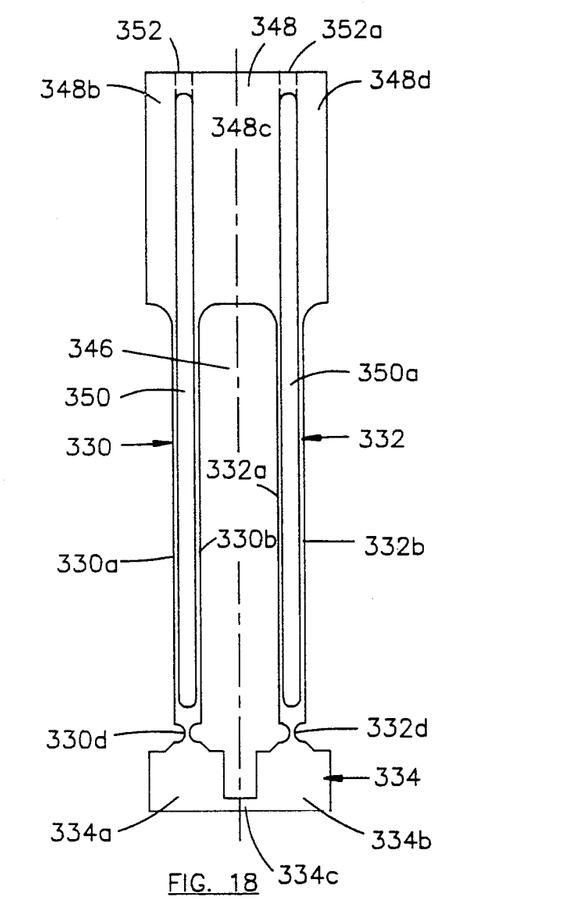
FIG. 18 is an enlarged plan view of another form of vibratory elements of the present invention.

Another form of resonator is shown in FIG. 18. In FIG. 18, the vibratory means 330,332 of the resonators basically consist of a pair of closed end tuning forks constructed from an electroetched metal plate member. As shown in plan view in FIG. 18, the plate member has pairs of vibrating metal elements 330a, 330b and 332a,332b which are formed by electroetching the plate member which is 0.005 inches thick. The plate member is constructed from a non-magnetic, high strength material with good elastic properties such as ELIGLOY which is available from the Elgin Company in Elgin, Ill. The plate member has a first, lower base portion 334 with rectangularly shaped sections 334a, 334b coupled to one another by a removable strip 334c. Each section 334a, 334b is respectively coupled to closely spaced vibrating elements 330a,330b and 332a,332b by necked down connector portions 330d,332d. The vibrating means are symmetrically spaced from a center line 346. The upper end of the vibrating elements 330a,330b and 332a,332b are connected to a second upper base portion 348. The width of the second base portion 348 is 0.200 inches and it can be attached by resistance welding to a KOVAR strip where the KOVAR strip is attached to the platform portion by electrically insulating glass. Similarly, the first base member 334 can have a width enabling attachment by resistance welding to a KOVAR strip where the KOVAR strip is attached to the frame member by glass. The vibrating elements 330a,330b, and 332a, 332b are 0.005 inches wide and 0.450 inches long between the base portions 334 and 348. The base portion 348 has slots or spaces 350,350a which extend downwardly between the respective beams 330a,330b and 332a,332b. The slots 350,350a extend upwardly into the base portion 348 to nearly the upper end of the base portion 348. This permits the sections 352,352a (shown in dashed line) to be cut away and leave three vertical spaced sections 348b,348c and 348d. The sections 352,352a are cut away after attachment to the frame member. The connector portion 334c is also cut away after attachment to provide for independent electrical terminal connections.

In the form of the invention shown in FIG. 18, the vibrating elements 330a,330b and 332a,332b are virtually identical being electroetched from the same sheet of material. The elements 330a and 330b are connected in an electrical series arrangement as are the elements 332a and 332b. Each element 330a and 332b is connected to an oscillator with the elements 330b and 332a being connected to ground so that current flows in opposite directions in the elements 330a,330b and in the elements 332a,332b. With opposing current flow, the opposing pairs of beam elements thus respectively vibrate in equal and opposite directions to decouple the vibrating beam members from the mounting structure.

Referring back to FIG. 13, as exemplary, the bourdon tube 266, the wires 228,230, the platform member 214 and the frame 190 are a common first assembly which have a first temperature coefficient of expansion. Ideally the temperature coefficient would be zero but a predictable temperature coefficient can be utilized. The resonators 220 and 222 are a second assembly which has a second temperature coefficient of expansion. The second coefficient of expansion for the second assembly is higher or different than the first coefficient of expansion for the first assembly. As a result, if the ambient temperature changes, the change in tension in the resonators 220,222 due to temperature will be equal. For example, if the ambient temperature increases, the tension in the resonators 220,222 will decrease. The converse is true if the temperature decreases. What is important is that the temperature effects on the resonators 220 and 222 are equal and are a function of the temperature expansion of the resonators.

In pressure sensor systems, the pressure measurements must be corrected for the effect of temperature changes in the transducer. With the foregoing structure the temperature deviation is sensed at the resonators which are the source of the pressure measurements so that temperature corrections are for temperature changes in the resonators.

It can be shown that the measurement of pressure P is primarily a function of the difference "d" of the frequencies in the dual vibrating resonator system described herein as follows:

$$d = F_1 2 - F_2 2$$

where $F_1$ and $F_2$ are the respective frequencies of the vibrating elements. It can also be shown that the temperature "t" of the resonators is primarily a function of the sum "s" of the frequencies, as follows:

$$s = F_1 2 + F_2 2$$

The temperature "t" value and pressure "P" value can be instantaneously correlated by use of the following relationships:

$$P = K_1 + K_2 d + K_3 d^2 + K_4 d^3$$

where the "K" factor is a polynomial expression which can be determined from the relationships:

$$K_1 = C_1 + C_{11} t + C_{12} t^2$$

$$K_2 = C_2 + C_{21} t + C_{22} t^2$$

$$K_3 = C_3 + C_{31} t + C_{32} t^2$$

$$K_4 = C_4 + C_{41} t + C_{42} t^2$$

where the "C" factor is a calibration coefficient of the transducer assembly.

Temperatures "t" can be determined as follows:

$$t = K_5 + K_6 s + K_7^2 s$$

$$K_5 = C_5 + C_{51} d + C_{52} d^2$$

$$K_6 = C_6 + C_{61} d + C_{62} d^2$$

$$K_7 = C_7 + C_{71} d + C_{72} d^2$$

The calibration coefficient constants are determined for a transducer by collecting data at constant temperature for temperature, pressure and frequency values for temperature values throughout the operating temperature range. The collected data is substituted into the equations to solve for the calibration coefficient constants "C" and the "K" factors.

Thus, the use of matched vibratory elements permits both pressure to be obtained in response to a moment force and temperature to be obtained in response to tension on the elements.

Figure 19:
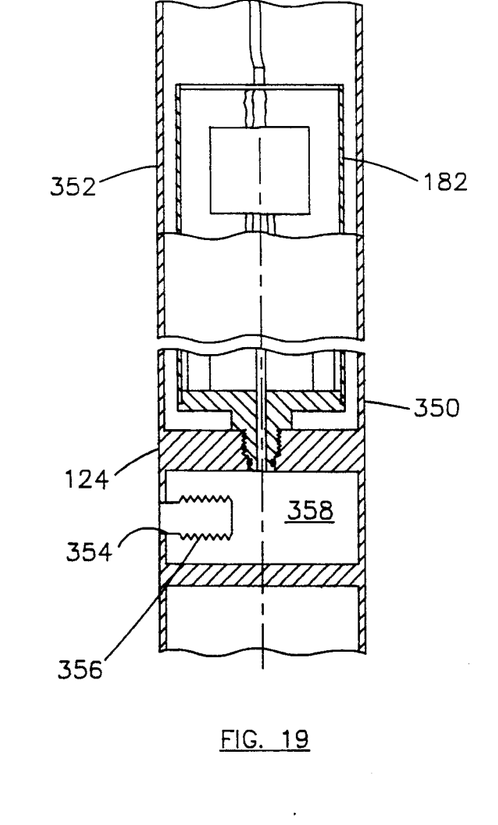
FIG. 19 is a partial view in longitudinal cross section to schematically illustrate the application of the present invention in a well tool.

Referring to FIG. 19, a well tool 350 sized for passage through a well bore has a bulkhead 124 which receives a sealed enclosure assembly 352. The assembly 352 contains the vibratory elements and measuring circuits in a vacuum condition. Borehole fluid pressure to be measured is accessed through a port 354 and may be separated from a non-compressible liquid 358 in the housing by a bellows 356.

Figure 20:
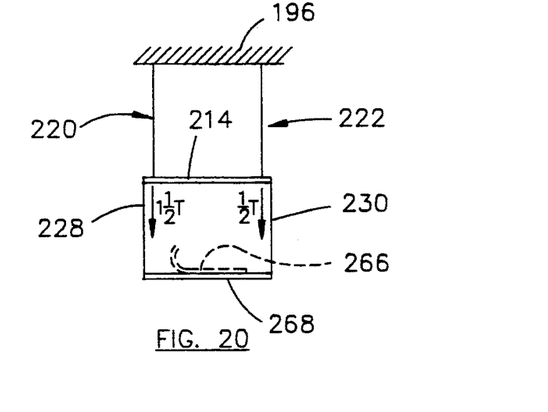
FIG. 20 is a force diagram illustrating a modified form of force applications.

Referring to FIG. 20, the bourdon tube 266 also can be attached to the base 268 so that the vibratory elements 220 and 222 respectively have tension values of 1.5T and 0.5T. Thus when the pressure produces a force moment the value of 1.5T is decreased while the value of 0.5T is increased. This allows a broader range of measurement of forces.

It will be apparent to those skilled in the art that various changes may be made in the invention without departing from the spirit and scope thereof and therefore the invention is not limited by that which is enclosed in the drawings and specifications but only as indicated in the appended claims.

I claim:

1. A force responsive resonator apparatus for use in obtaining frequency output signal from vibratory metal elements as a function of a moment force and tension including
   a fixed base member;
   an elongated movable coupling platform spaced from said fixed base member;
   at least two elongated metal non-magnetic vibratable elements disposed in parallel relationship in a plane and attached to said base member and to said coupling platform;
   means for mounting said coupling platform relative to said fixed base member and said vibratable elements for movement of said coupling platform to effect a tension force in each of said vibratable elements;
   means acting on said coupling platform for applying a preset tension force to each of said vibratable elements;
   means for applying a moment force to said coupling platform in the plane of said parallel relationship for changing the preset tension forces in each of said vibratable elements as a function of the moment force,
   electromagnetic means for vibrating said vibratable elements and for producing a frequency output signal from each of said vibratable elements as a function of the tension forces in said vibratable elements;

said metal vibratable elements being double ended tuning fork members constructed from a common plate member and each vibratable element having parallel portions; and means for conducting current in opposite directions through the parallel portions of a vibratable element.

2. A force responsive resonator apparatus for use in obtaining frequency output signal from vibratory metal elements as a function of a moment force and tension including a fixed base member;

an elongated movable coupling platform spaced from said fixed base member;

at least two elongated metal non-magnetic vibratable elements disposed in parallel relationship in a plane and attached to said base member and to said coupling platform;

means for mounting said coupling platform relative to said fixed base member and said vibratable elements for movement of said coupling platform to effect a tension force in each of said vibratable elements;

means acting on said coupling platform for applying a preset tension force to each of said vibratable elements;

means for applying a moment force to said coupling platform in the plane of said parallel relationship for changing the preset tension forces in each of said vibratable elements as a function of the moment force;

electromagnetic means for vibrating said vibratable elements and for producing a frequency output signal from each of said vibratable elements as a function of the tension forces in said vibratable elements;

said metal vibratable elements respectively being single beam members constructed from a common plate member and include decoupling means for attaching mounting elements on the vibratable elements to the base member and to the coupling platform.

3. The apparatus as set forth in claims 1 or 2 wherein said vibratable elements are attached by electrically insulating seals to at least one of said base member and said coupling platform.

4. The apparatus as set forth in claims 1 or 2 wherein said means acting on said coupling platform for applying a preset tension force includes a spirally arranged bourdon tube connected to said fixed base member.

5. The apparatus as set forth in claim 4 wherein said means acting on said coupling platform further includes a pair of parallel arranged wire members connecting said coupling platform to a terminal end of said bourdon tube and where said terminal end is disposed transverse to said wire members with said wire members being in vertical alignment with said plane of parallel relationship.

6. The apparatus as set forth in claim 5 wherein said coupling platform has force balancing means constructed and arranged to balance out gravity effects.

7. The apparatus as set forth in claims 1 or 2 wherein said means for mounting said coupling platform includes a pivot connection on said coupling platform where the pivot connection is attached to a flexible portion of the base member.

8. The apparatus as set forth in claim 7 wherein said flexible portion of said base member is displaceable, and means on said base member for displacing said flexible position for applying the pre-set tension forces.

9. The apparatus as set forth in claims 1 or 2 wherein said coupling platform is attached by a pivot connection to a flexible portion of the base member;

means for attaching said base member to an elongated support means; and means acting on said coupling platform further includes a pair of parallel arranged wire members connecting said coupling platform to a terminal end of said bourdon tube and where said terminal end is disposed transverse to said wire members with said wire members being in vertical alignment with said plane of parallel relationship.

10. The apparatus as set forth in claims 1 or 2 wherein said metal vibratable elements are identically formed in a side-by-side relationship and provide for matching electrical connection locations.

11. A force responsive resonator apparatus for use in obtaining frequency output signal from vibratory metal elements as a function of a moment force and tension including a fixed base member;

an elongated movable coupling platform spaced from said fixed base member;

at least two elongated metal non-magnetic vibratable elements disposed in parallel relationship in a plane and attached to said base member and to said coupling platform;

means for mounting said coupling platform relative to said fixed base member and said vibratable elements for movement of said coupling platform to effect a tension force in each of said vibratable elements;

means acting on said coupling platform for applying a preset tension force to each of said vibratable elements;

means for applying a moment force to said coupling platform in the plane of said parallel relationship for changing the preset tension forces in each of said vibratable elements as a function of the moment force;

said metal vibratable elements having a first coefficient of temperature expansion and said means for mounting said coupling platform has a second coefficient of temperature expansion which is different than said first coefficient of temperature expansion so that a change in temperature produces a related change in said tension force in each of said vibratable elements which is correlatable to temperature.

12. Apparatus as set forth in claim 11 and further including means for vibrating said vibratable element and for producing a frequency output signal from each of said vibratable elements as a function of said tension forces in each of said vibratable elements.

13. Apparatus as set forth in claim 12 and further including means for combining said frequency output signals for obtaining a correction signal which is a function of the temperature.

14. Apparatus as set forth in claim 12 and further including means for combining said frequency output signals for obtaining a correlation signal which is a function of the temperature and for obtaining a measurement signal which is a function of the moment force.

15. Apparatus as set forth in claim 14 where said moment force is produced by a bourdon tube which senses pressure.

16. A force responsive resonator apparatus for providing a measurement of force including:
pressure responsive means for developing a moment force between two points in a first plane in response to an applied pressure to be measured;
at least two elongated vibratory, non-magnetic metal elements, said metal elements being respectively coupled between said two points and two fixed locations and being disposed essentially parallel to one another in a common plane where the common plane is essentially parallel to said first plane; and
tension means for applying a common bias tension effect at said two points and for splitting said common tension effect between said metal elements.

17. The apparatus as set forth in claim 16 and further including vibrating means for vibrating each of said vibratory metal elements at a resonant frequency, said vibratory metal elements respectively increasing and decreasing frequencies relative to their resonant frequency when a moment force is applied by said pressure responsive means.

18. The transducer as set forth in claim 17 wherein said vibrating means includes magnetic pole members disposed to either side of said metal elements.

19. The apparatus as set forth in claim 18 wherein said metal vibratory elements are respectively single beam members constructed from a plate member and include decoupling means for attaching mounting elements on a vibratory element to the base member and to the coupling members.

20. The apparatus as set forth in claim 18 wherein said vibratory elements are double ended tuning fork members constructed from a common plate member and each vibratory element has parallel portions, and
means for conducting current in opposite directions through the parallel portions of a vibratory element.

21. The apparatus as set forth in claim 16 wherein a moment arm member extends between said two points and said elongated vibratory metal elements, and said tension means for applying tension acts at essentially the pivot point of said moment arm member at a location between the two metal elements.

22. The transducer as set forth in claim 16 wherein said vibratory metal elements are fabricated from adjacent portions of a construction plate material to match the physical characteristics in the metal elements to one another.

23. A force responsive transducer for providing a measurement of force including
a pair of elongated vibratory, non-magnetic metal elements arranged in a parallel relationship in a common plane and having a first temperature coefficient of expansion;
first support structure for mounting one pair of ends of said metal elements, second support structure for mounting the other pair of ends of said metal elements, said support structure having a second temperature coefficient of expansion, said first support structure and said second support structure being arranged for placing said metal elements under a common tension;
said second temperature coefficient of expansion being different than said first temperature coefficient of expansion so that the common tension in said metal elements changes as a function of temperature of the metal elements and the support structure where changes in tension are usable to calibrate the vibratory response of said metal elements.

24. The transducer as set forth in claim 23 wherein one of said support structures has a pivot location for applying tension and wherein said pivot location is located intermediate of said vibratory elements.

25. The transducer as set forth in claim 24 and further including means for applying a moment force to said one support structure about said pivot location for producing an opposite change in tension in said vibratory metal elements.

26. The transducer as set forth in claim 25 and further including pressure responsive means for producing said moment force.

27. A force sensitive pressure transducer, said transducer comprising a housing sized and configured for placement in a liquid pressure environment, said housing having an opening in the wall thereof;
a frame member for mounting spaced apart metallic resonator elements thereon, said frame member being rigidly mounted in said housing and having a rigid transverse frame section on one end thereof and a tension platform section on the other, said tension platform section being integrally joined at its mid-point to said frame member by a thin portion of said frame member which provides a fulcrum for said tension platform;
a pair of elongate electrically conductive resonator elements of non-magnetic metal attached at their respective ends to said rigid transverse frame section and to respective ends of said tension platform section on opposite sides of said fulcrum in parallel spaced relation to one another and in electrically insulated relationship with said frame member;
means for applying preset tension forces in each of said resonator elements for adjusting the resonant frequency of each of said resonator elements to determinable values;
electromechanical means for inducing vibrations of resonant frequency in each of said resonator elements;
pressure sensing means mounted in said housing for sensing the pressure in the environment external of said housing and including a force coupling element for developing a moment force in response to pressure external of said housing; and
coupling means for coupling the ends of said force coupling element to the ends of said tension platform, said coupling means comprising a pair of coupling elements, one of which couples one end of the force coupling element to one end of said tension platform and the other coupling element couples the other end of the force coupling element to the other end of the tension platform, whereby fluid pressure applied to the pressure sensing means applies a moment force to said force coupling element and said tension platform for producing tension forces in said resonator wires where the frequency of vibration of each of said resonator elements is an indication related to fluid pressure.

28. A force sensitive pressure transducer as set forth in claim 27 further including mechanical balance element for adjusting the balance of said force coupling block when said force sensitive pressure transducer is disposed at different angles of orientation with respect to the direction of the earth's gravitational force.

29. A force sensitive pressure transducer as set forth in claim 27 wherein said resonator elements are electrically conductive wires of non-magnetic metal.

30. A force sensitive pressure transducer as set forth in claim 27 wherein said resonator elements are elongate vibrating beams of electrically conductive non-magnetic material.

31. A force sensitive pressure transducer as set forth in claim 27 wherein said elongate vibratory beams are formed adjacent to each other in the same sheet of plate material.

32. A force sensitive pressure transducer as set forth in claim 31 wherein said means for inducing vibrations of resonant frequency in each of said resonator elements includes an oscillator electrically connected to each of said resonator elements to induce current flow in one resonator element which is in opposite direction to current flow in the other resonator element whereby said resonator elements are vibrated in opposite directions for decoupling the vibrations from said framework.

33. A force sensitive pressure transducer as set forth in claim 27 wherein said coupling means comprises a pair of coupling wires.

34. A force sensitive pressure transducer, said transducer comprising a housing sized and configured for placement in a liquid pressure environment, said housing having an opening in the wall thereof;
  a frame member for mounting spaced apart metallic resonator elements thereon, said frame member being rigidly mounted in said housing and having a rigid transverse frame section on one end thereof and a tension platform section on the other, said tension platform section being integrally joined at its mid-point to said frame member by a thin portion of said frame member which provides a fulcrum for said tension platform;
  a pair of elongate electrically conductive resonator elements of non-magnetic metal attached at their respective ends to said rigid transverse frame section and to respective ends of said tension platform section on opposite sides of said fulcrum in parallel spaced relation to one another and in electrically insulated relationship with said frame member;
  means for applying preset tension forces in each of said resonator elements for adjusting the resonant frequency of each of said resonator elements to determinable values;
  electromechanical means for inducing vibrations of resonant frequency in each of said resonator elements;
  a bourdon tube mounted in said housing, said bourdon tube having straight end portions and an intermediate spirally wound section joining said straight end portions, one of said straight end portions being open-ended and mounted in said opening in the housing wall to place the interior of the bourdon tube in fluid communication with the environment external of said housing, the other of said straight end portions being rigidly attached along at least a portion of its length to a force coupling block; and
  coupling means for coupling the ends of said force coupling element to the ends of said tension platform, said coupling means comprising a pair of coupling elements, one of which couples one end of the force coupling element to one end of said tension platform and the other coupling element couples the other end of the force coupling element to the other end of the tension platform, whereby fluid pressure applied to the interior of said bourdon tube applies a moment force to said force coupling element and said tension platform which affects the tension forces in said resonator elements and the frequency of vibration of each of said resonator elements as an indication related to fluid pressure.

35. A force sensitive pressure transducer as set forth in claim 34 wherein said resonator elements are elongate vibrating beams of electrically conductive non-magnetic material.

36. A force sensitive pressure transducer as set forth in claim 35 wherein said elongate vibratory beams are etched adjacent to each other on the same sheet of plate material.

37. A force responsive resonator apparatus for use in obtaining frequency output signal from vibratory metal elements as a function of a moment force and tension including
  a fixed base member;
  an elongated movable coupling platform spaced from said fixed base member;
  at least two elongated metal non-magnetic vibratable elements disposed in parallel relationship in a plane and attached to said base member and to said coupling platform;
  means for mounting said coupling platform relative to said fixed base member and said vibratable elements so that a torque force on said coupling platform in the plane of said parallel relationship produces an increase in a preset tension force in one of said vibratable elements and a decrease in a preset tension force in the other of said vibratable elements;
  means acting on said coupling platform for applying the preset tension force to each of said vibratable elements;
  means for applying a moment force to said coupling platform to the vibratable elements in the plane of said parallel relationship for changing the preset tension forces in each of said vibratable elements as a function of the moment force.

38. The apparatus as set forth in claim 37 and further including electromagnetic means for vibrating said vibratable elements and for producing a frequency output signal from each of said vibratable elements as a function of the tension forces in said vibratable elements.

* * * * *